US010330522B2

(12) United States Patent
Paul et al.

(10) Patent No.: US 10,330,522 B2
(45) Date of Patent: Jun. 25, 2019

(54) PERSON SUPPORT APPARATUS WITH EXIT DETECTION SYSTEM AND/OR SCALE SYSTEM

(71) Applicant: Stryker Corporation, Kalamazoo, MI (US)

(72) Inventors: Anish Paul, Portage, MI (US); Joseph Adam Upchurch, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 148 days.

(21) Appl. No.: 15/371,328

(22) Filed: Dec. 7, 2016

(65) Prior Publication Data
US 2017/0176240 A1    Jun. 22, 2017

Related U.S. Application Data

(60) Provisional application No. 62/268,549, filed on Dec. 17, 2015.

(51) Int. Cl.
*G01G 19/44*   (2006.01)

(52) U.S. Cl.
CPC .................. *G01G 19/44* (2013.01)

(58) Field of Classification Search
CPC ......... G01G 19/44; G01G 23/18; G01G 21/28
USPC ........................................................ 177/46
See application file for complete search history.

(56) References Cited

U.S. PATENT DOCUMENTS

| 4,483,404 A | 11/1984 | Weihs |
| 4,540,057 A | 9/1985 | Freeman |
| 4,549,622 A | 10/1985 | Leiman |
| 4,560,017 A | 12/1985 | Hood |
| 4,581,948 A | 4/1986 | Reichow |
| 4,593,778 A | 6/1986 | Konishi et al. |
| 4,815,547 A | 3/1989 | Dillon et al. |
| 4,932,253 A | 6/1990 | McCoy |
| 4,974,692 A | 12/1990 | Carruth et al. |
| 5,276,432 A | 1/1994 | Travis |
| 5,802,640 A | 9/1998 | Ferrand et al. |
| 5,844,488 A | 12/1998 | Musick |
| 6,208,250 B1 | 3/2001 | Dixon et al. |
| 6,822,571 B2 | 11/2004 | Conway |
| 6,924,441 B1 | 8/2005 | Mobly et al. |

(Continued)

FOREIGN PATENT DOCUMENTS

| EP | 0744598 A1 | 11/1996 |
| WO | 2009029996 A1 | 3/2009 |
| WO | 2011/113070 | 9/2011 |

*Primary Examiner* — Jacques M Saint Surin
(74) *Attorney, Agent, or Firm* — Warner Norcross + Judd LLP

(57) ABSTRACT

A person support apparatus, such as a bed, cot, recliner, chair, stretcher, or the like, includes a frame, a support surface, a plurality of load cells, and first and second channels dimensioned to receive noses of at least one of the load cells. The first channel constrains a first one of the load cells in a first direction but not a second direction that is perpendicular to the first direction. The second channel constrains the second load cell in the second direction but not the first direction. The person support apparatus may also include a plurality of load cell brackets that are each adapted to support an end of one of the load cells. When included, the load cell brackets are constructed such that no forces from the support surface, other than weight forces, are applied to the load cells after the support surface is coupled to the frame.

23 Claims, 10 Drawing Sheets

(56) References Cited

U.S. PATENT DOCUMENTS

| | | |
|---|---|---|
| 7,253,366 B2 | 8/2007 | Bhai |
| 7,714,728 B2 | 5/2010 | Koblasz |
| 8,042,206 B2 | 10/2011 | Genaro |
| 8,272,087 B2 | 9/2012 | Westermann |
| 8,844,076 B2 | 9/2014 | Becker et al. |
| 9,013,313 B2 | 4/2015 | Paine |
| 9,138,173 B2 | 9/2015 | Penninger et al. |
| 9,179,863 B2 | 11/2015 | Brauers et al. |
| 2007/0038155 A1 | 2/2007 | Kelly, Jr. et al. |
| 2008/0120784 A1 | 5/2008 | Warner et al. |
| 2009/0044334 A1 | 2/2009 | Parsell et al. |
| 2011/0068932 A1 | 3/2011 | Flocard et al. |
| 2014/0059768 A1 | 3/2014 | Lemire et al. |
| 2014/0313030 A1 | 10/2014 | Ten Kate et al. |
| 2014/0343889 A1 | 11/2014 | Ben Shalom et al. |
| 2015/0238123 A1 | 8/2015 | Yakam et al. |

12# PERSON SUPPORT APPARATUS WITH EXIT DETECTION SYSTEM AND/OR SCALE SYSTEM

CROSS-REFERENCE TO RELATED APPLICATIONS

This application claims priority to U.S. provisional patent application Ser. No. 62/268,549 filed Dec. 17, 2015, by inventors Anish Paul et al. and entitled PERSON SUPPORT APPARATUS WITH EXIT DETECTION SYSTEM, the complete disclosure of which is incorporated herein by reference.

BACKGROUND

The present disclosure relates to person support apparatuses, such as, but not limited to, beds, cots, stretchers, recliners, chairs, operating tables, and the like; and more particularly to an exit alerting feature and/or scale feature of the person support apparatus.

Person support apparatuses often include an exit detection system and/or a scale system. The exit detection system issues an alert when it is armed and the occupant of the person support apparatus subsequently exits the person support apparatus. The scale system measures the weight of an occupant of the person support apparatus. Many times, the exit detection system and/or scale system utilize common components, such as a plurality of load cells that detect the weight of the occupant of the person support apparatus.

SUMMARY

In its various embodiments, the present disclosure provides an improved exit detection system and/or scale system for a person support apparatus. The exit detection system and/or scale system is designed, in at least one embodiment, to avoid the need for zeroing the sensors prior to arming the exit detection system or taking a weight reading using the scale system. In some embodiments, the person support apparatus includes a plurality of load cells that are supported on their ends by a plurality of channels that constrain movement of the ends to one direction. At least one of the channels allows movement in a first direction but not a second direction, and at least one other of the channels allows movement in the second direction but not the first direction, wherein the first and second directions are perpendicular to each other.

According to one embodiment, a person support apparatus is provided that includes a frame, a support surface, a plurality of load cells, and first and second channels. The support surface supports a person thereon. The load cells each have a nose and a body and are coupled to the frame and the support surface such that a weight applied to the support surface is detected by the load cells. The first channel is dimensioned to receive a nose of a first one of the plurality of load cells and constrain the first load cell in a first direction but not a second direction. The second channel is dimensioned to receive a nose of a second one of the plurality of load cells and constrain the second load cell in the second direction but not the first direction. The first direction is perpendicular to the second direction.

According to another embodiment, a person support apparatus is provided that includes a frame, a support surface, a plurality of load cells, and a plurality of load cell brackets. The support surface supports a person thereon. The plurality of load cells are coupled to the frame and the support surface such that a weight applied to the support surface is detected by the plurality of load cells. The plurality of load cell brackets are adapted to support ends of the load cells and are constructed such that no forces from the support surface, other than weight forces, are applied to the load cells after the support surface is coupled to the frame.

According to other embodiments, the support surface is a seat of a chair.

The first and second channels, in some embodiments, are defined in first and second brackets, respectively, and the first and second brackets are fixedly secured to the frame.

For some embodiments, a third channel is provided that is dimensioned to receive a nose of a third one of the plurality of load cells and constrain the third load cell in the first direction but not the second direction. Still further, some embodiments also include a fourth channel dimensioned to receive a nose of a fourth one of the plurality of load cells and constrain the fourth load cell in both the first and second directions.

The first direction may be a generally vertical direction.

In some embodiments, the person support apparatus further includes a first spring washer positioned around the nose of the first load cell and adapted to eliminate slack between the first load cell and the first bracket in a third direction. The third direction is perpendicular to both the first and second directions.

A controller is provided in some embodiments that determines if the seat is occupied based upon outputs from the load cells. The controller is adapted to issue an exit alert in one or more of the following situations: if a total weight detected by the plurality of load cells falls below a predetermined minimum threshold; if a total weight detected by the plurality of load cells falls by more than a predetermined amount relative to a previously stored total weight; or if a sum of weight detected by the plurality of load cells falls by more than a variable amount relative to a previously stored total weight. In some embodiments, the previously stored total weight is taken automatically by the controller, such as at the moment a user of the person support apparatus activates an exit alerting feature of the person support apparatus. The variable amount may be based upon the previously stored total weight.

The load cell brackets are constructed, in at least one embodiment, so that the support surface is not subjected to any deformation detectable by the load cells when the support surface is coupled to the frame.

In some embodiments, the controller communicates with a memory that includes load-cell specific calibration data stored therein and a weight value. The controller determines if the seat is occupied or not using the load-cell specific calibration data and the weight value. The weight value is stored in the memory when the person support apparatus is manufactured and has the same magnitude as weight values stored in memories of other like-manufactured person support apparatuses.

The controller uses no person support apparatus-specific calibration data that is individually tailored to the person support apparatus when determining if the seat is occupied or not, in at least some embodiments.

In still other embodiments, the controller determines a weight of an occupant of the seat and limits a functionality of at least one motor of the person support apparatus if the weight of the occupant of the seat exceeds a threshold. Additionally, or alternatively, the controller changes a speed of at least one motor of the person support apparatus if the weight of the occupant of the seat exceeds a threshold.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
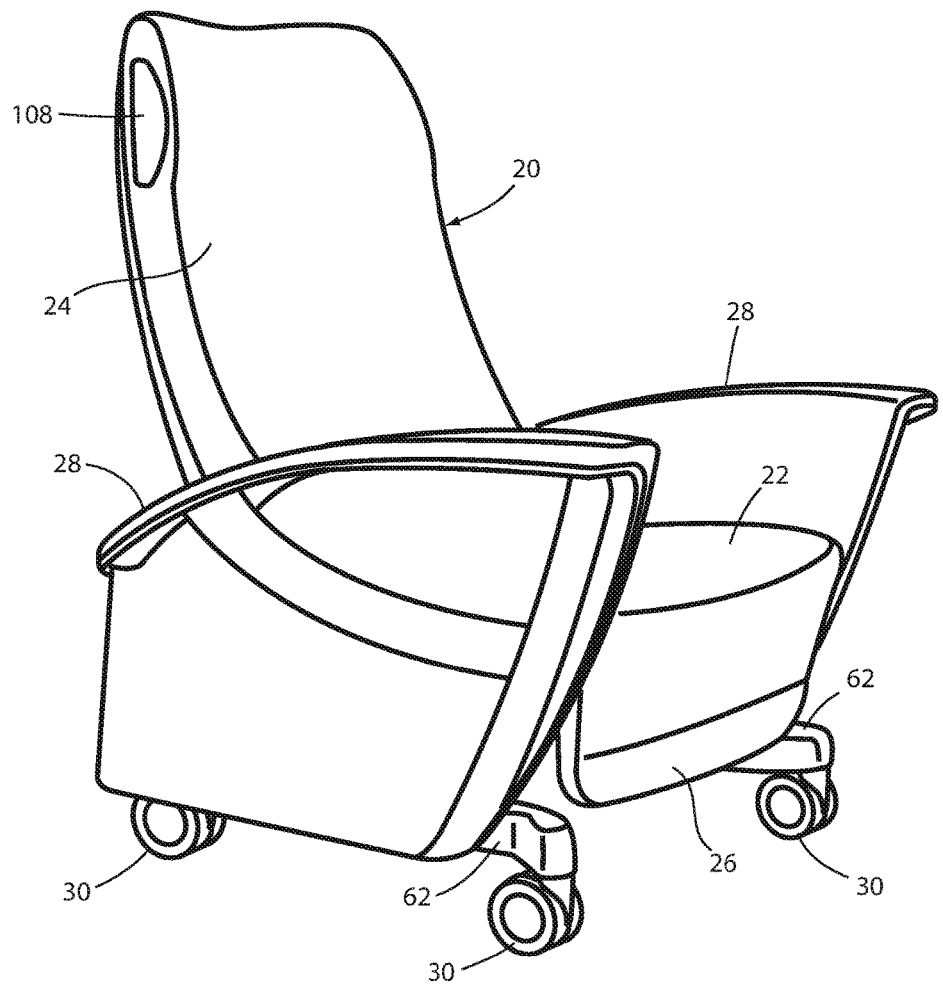
FIG. 1 is a perspective view of one embodiment of a person support apparatus according to one aspect of the present disclosure.

A person support apparatus 20 according to one embodiment is shown in FIG. 1. Person support apparatus 20 is shown in FIG. 1 to be a recliner. Although the following written description will be made with respect to a recliner, it will be understood by those skilled in the art that the principles disclosed herein may also be incorporated into other types of person support apparatuses besides recliners, such as, but not limited to, beds, stretchers, cots, surgical tables, chairs, or the like.

Person support apparatus 20 includes a seat 22, a backrest 24, a leg rest 26, a pair of armrests 28, and a plurality of wheels 30. Person support apparatus 20 is constructed such that both the height and tilt of seat 22 is adjustable. Further, person support apparatus 20 is constructed such that backrest 24 is pivotable between a generally upright position, such as shown in FIG. 1, and a virtually infinite number of rearwardly reclined positions. Leg rest 26 is constructed such that it is able to be moved between a retracted position, such as shown in FIG. 1, and an extended position, in which leg rest 26 is oriented generally horizontally and extends forwardly from seat 22. Armrests 28, in the illustrated embodiment, are constructed such that a user can raise and lower their height relative to seat 22.

In at least one embodiment, those components of person support apparatus 20 that are not explicitly described herein are constructed in accordance with any of the embodiments disclosed in commonly assigned, copending U.S. patent application Ser. No. 14/212,253 filed Mar. 14, 2014 by inventors Christopher Hough et al. and entitled MEDICAL SUPPORT APPARATUS, the complete disclosure of which is incorporated herein by reference. The movement and control of person support apparatus 20 may also be carried out in accordance with the disclosure of commonly assigned, copending U.S. patent application Ser. No. 14/801,167 filed Jul. 16, 2015 by inventors Anish Paul et al. and entitled MEDICAL SUPPORT APPARATUS, the complete disclosure of which is also incorporated herein by reference. Person support apparatus 20 may also be constructed in other manners besides those described in these two commonly assigned patent applications.

Figure 2:
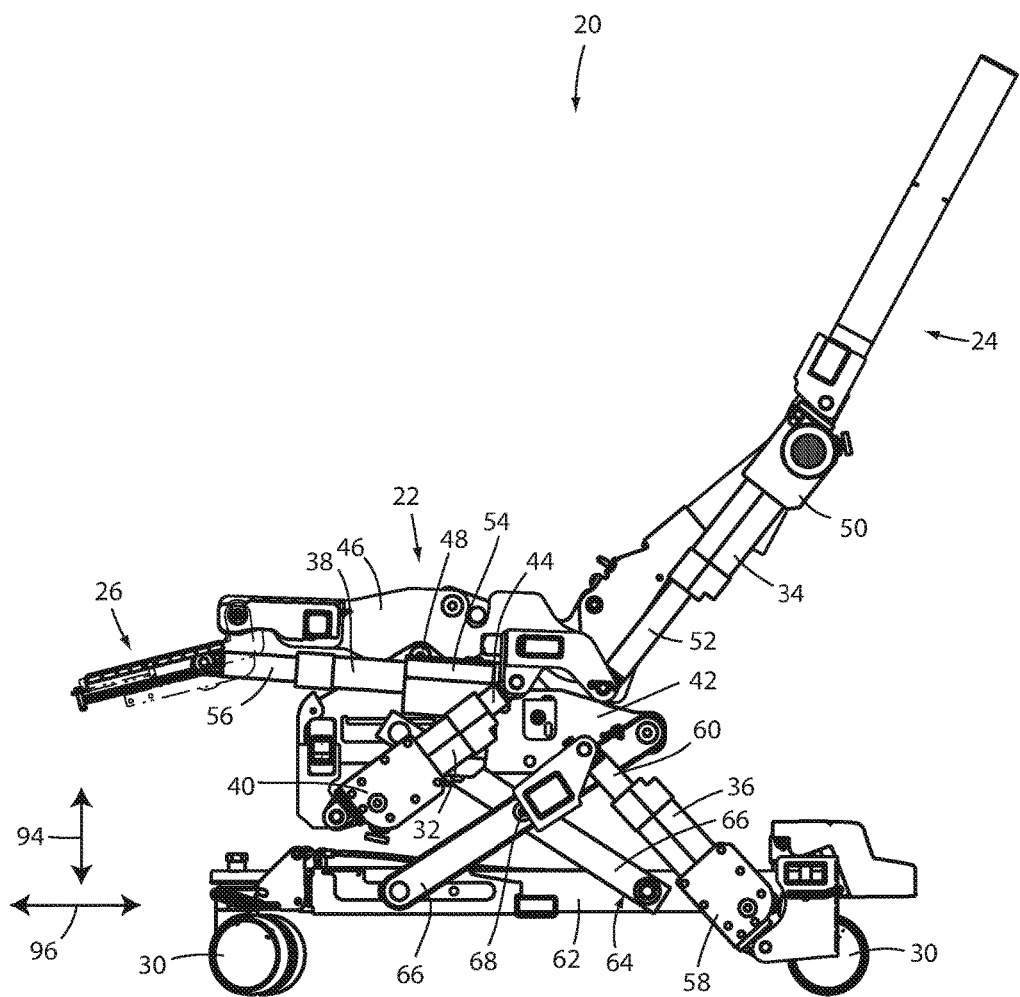
FIG. 2 is a side elevational view of the person support apparatus of FIG. 1 with several components removed in order to illustrate a plurality of actuators incorporated into the person support apparatus.
Figure 7:
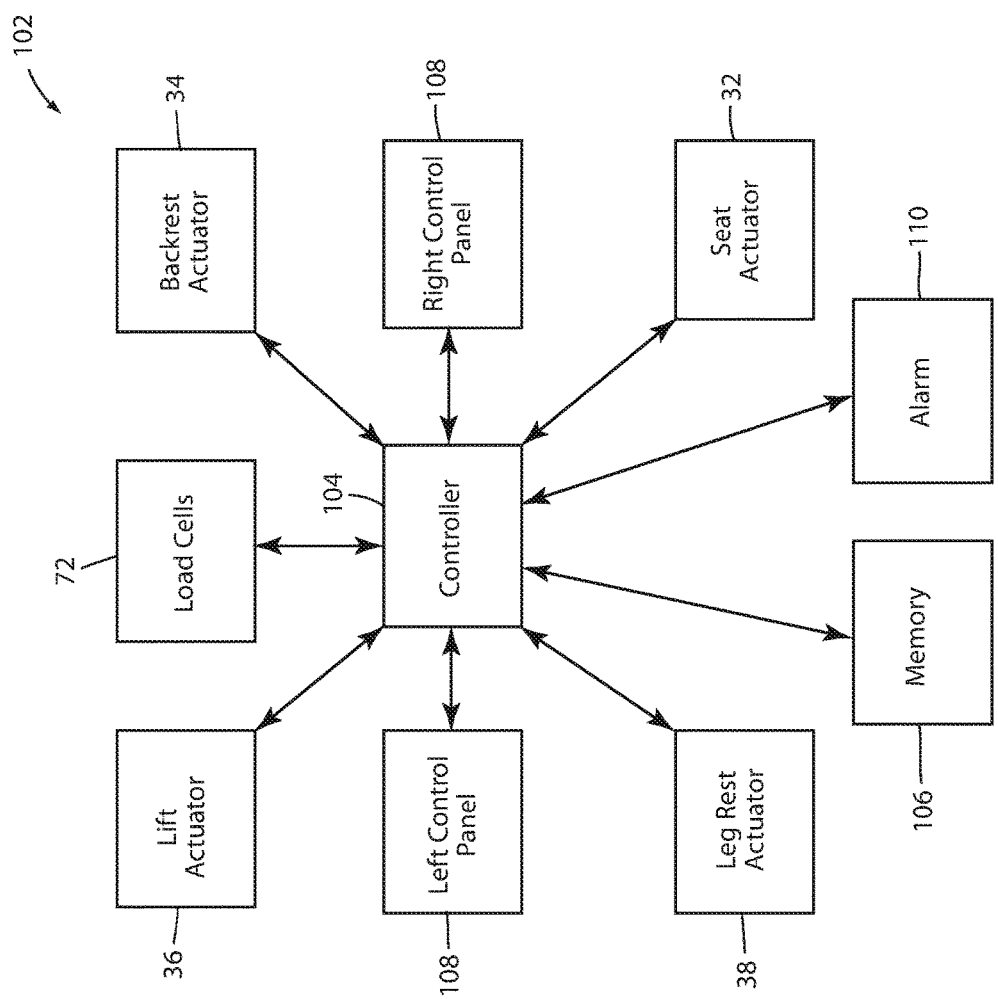
FIG. 7 is a block diagram of a control system used in the person support apparatus of FIG. 1.

FIG. 2 shows various internal components of person support apparatus 20, including a seat actuator 32, a backrest actuator 34, a lift actuator 36, and a leg rest actuator 38. Each of actuators 32, 34, 36, and 38 are motorized linear actuators that are designed to linearly extend and retract under the control of a controller 104 (FIG. 7). Seat actuator 32 includes a stationary end 40 that is pivotally mounted to a frame 42 of person support apparatus 20. Seat actuator 32 further includes an extendible end 44 that is pivotally mounted to a seat pan 46. When seat actuator 32 extends or retracts, extendible end 44 causes seat pan 46 to pivot about a seat pivot axis 48. The extension of seat actuator 32 therefore causes seat pan 46 to tilt in such a manner that a forward end of seat 22 moves downward relative to a backward end of seat 22 (i.e. seat pan 46 rotates in a counterclockwise direction as shown in FIG. 2). The retraction of seat actuator 32, in contrast, causes seat pan 46 to tilt in the opposite manner (i.e. seat pan 46 rotates in a clockwise direction as shown in FIG. 2).

Backrest actuator 34 includes a stationary end 50 that is mounted to backrest 24 and an extendible end 52 that is mounted to seat pan 46. The extension and retraction of backrest actuator 34 therefore causes backrest 24 to pivot with respect to seat pan 46. More specifically, when backrest actuator 34 extends, backrest 24 rotates in a counterclockwise direction in FIG. 2. In contrast, when backrest actuator 34 retracts, backrest 24 rotates in a clockwise direction in FIG. 2. Because backrest 24 is coupled to seat pan 46, the rotation of seat pan 46 by seat actuator 32 also causes backrest 24 to rotate with respect to the floor as seat pan 46 rotates. This rotation, however, is independent of the rotation of backrest 24 caused by backrest actuator 34. In other words, the relative angle between backrest 24 and seat pan 46 only changes when backrest actuator 34 is actuated (and not when seat actuator 32 extends or retracts while backrest actuator 34 does not change length). The angle of backrest 24 with respect to the floor (or another fixed reference), however, changes as seat pan 46 pivots about seat pivot axis 48.

Leg rest actuator 38 includes a stationary end 54 that is mounted to seat pan 46 and an extendible end 57 that is mounted to leg rest 26. The extension of leg rest actuator 38 therefore pivots leg rest 26 from a retracted position (e.g. FIG. 1) to an extended position in front of seat 22. The physical construction of leg rest 26 may take on any of the forms disclosed in the commonly assigned U.S. patent application Ser. No. 14/212,253 mentioned above, whose disclosure is incorporated completely herein by reference. Other physical constructions of leg rest 26 are also possible. The extension and retraction of leg rest actuator 38 changes the orientation of leg rest 26 with respect to seat pan 46. The orientation of leg rest 26 with respect to seat pan 46 does not change based on the extension or contraction of any other actuators 32, 34, or 36. The orientation of leg rest 26 with respect to the floor (or some other fixed reference), however, changes when seat pan 46 is pivoted about seat pivot axis 48 by seat actuator 32. In summary, then, the pivoting of seat pan 46 about its pivot axis 48 therefore changes the orientations of all of seat 22, backrest 24, and leg rest 26 with respect to the floor (or other fixed reference), but does not, by itself, change the orientations of any of these components (seat 22, backrest 24, and leg rest 26) with respect to each other.

Lift actuator 36 includes a stationary end 58 that is coupled to a base 62 and an extendible end 60 that is coupled to an X-frame lift 64. X-frame lift 64 includes two legs 66 that are pivotally coupled to each other about a center axis 68. When lift actuator 36 extends or retracts, the relative angle between each of the legs 66 changes, which changes the overall height of X-frame lift 64. Further, because frame 42 is mounted on a top end of X-frame lift 64, the changing height of X-frame lift 64 changes the height of frame 42. Lift actuator 36 therefore raises the height of frame 42 when it extends and lowers the height of frame 42 when it retracts. Because seat pan 46 is mounted (pivotally) on frame 42, and because backrest 24 and leg rest 26 are both mounted to seat pan 46, raising and lowering the height of frame 42 simultaneously raises and lowers the height of seat 22, backrest 24, and leg rest 26. However, extending and retracting lift actuator 36 does not, by itself, change the angular orientations of any of leg rest 26, backrest 24, and/or seat 22, either with respect to each other or with respect to the floor.

Each of the actuators 32-38 is powered by a direct current (DC) electrical motor. That is, each of the actuators 32-38 extends or retracts in response to its associated motor being driven in one direction or its opposite direction. The control of each motor is carried out by a control system 102 (FIG. 7), which will be discussed in greater detail below.

FIGS. 3-6 illustrate in greater detail the mechanical coupling of seat pan 46 to frame 42. This coupling is accomplished through the use of four load cells 74. As will be discussed herein, load cells 74 are mounted to seat pan 46 and frame 42 such that the weight of seat pan 46, and all of the components of person support apparatus 20 that are attached thereto, is supported by load cells 74. Load cells 74 are therefore able to detect when a person sits on seat 22 and when the person exits seat 22, due to the person's weight being added to and removed from the load supported by load cells 74, as will be discussed in greater detail below.

Figure 3:
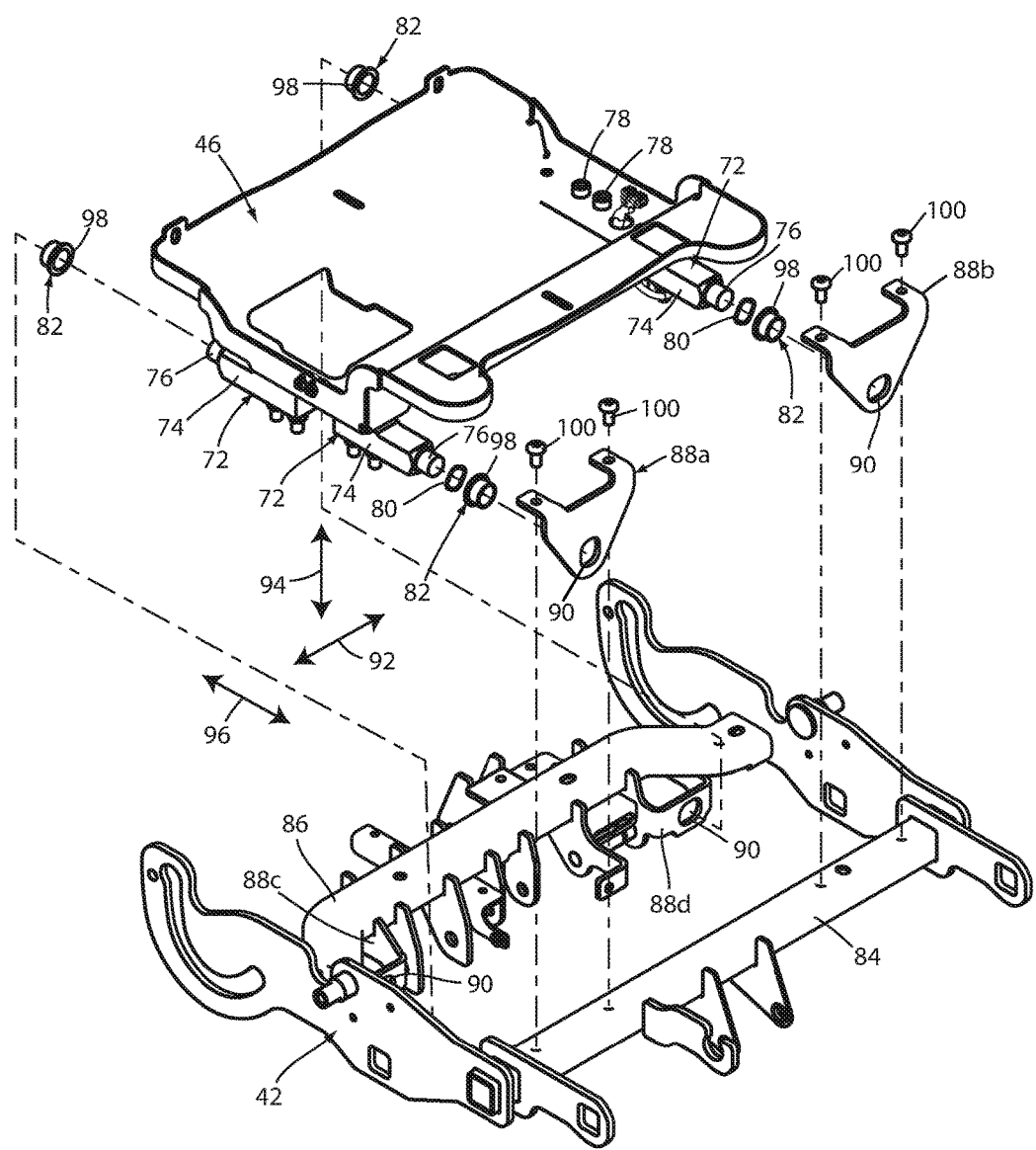
FIG. 3 is an exploded, perspective view of a seat pan and frame of the person support apparatus of FIG. 1.
Figure 4:
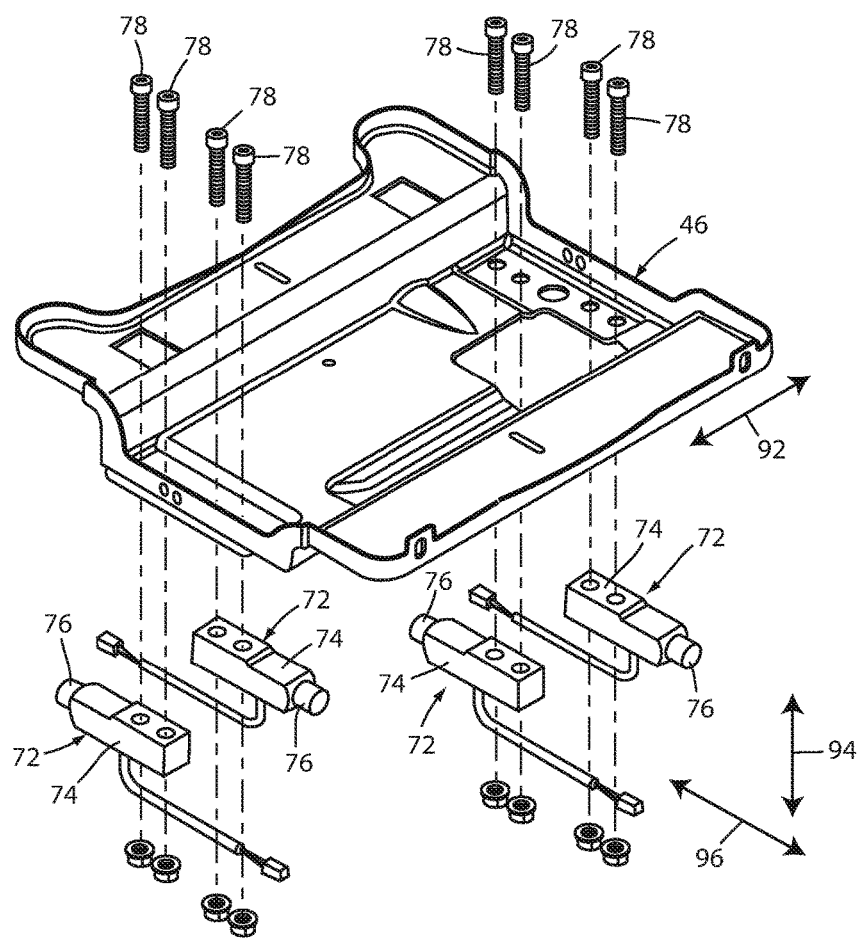
FIG. 4 is an exploded view of the seat pan and a plurality of load cells.

As shown in FIGS. 3 and 4, each load cell 74 includes a body portion 76 and an end portion 76. Body portion 76 is generally rectangular in cross-section while end portion 76 is generally circular in cross section, although load cells having shapes different from those depicted in the drawings may be used. In at least one embodiment, load cells 74 are conventional, off-the-shelf, load cells that are commercially available from multiple vendors, as would be known to one of skill in the art. Load cells 74 are rigidly secured to the underside of seat pan 46 by a pair of bolts 78, or other suitable fasteners (FIG. 4). A spring washer 80 is secured to each end portion 76 of each load cell 74 (FIG. 3). A substantially cylindrical bushing 82 is also secured to each end portion 76 of each load cell 74. Bushings 82 are, in at least one embodiment, made from a suitable plastic. Bushings 82 each have an inner circular bore that is dimensioned slightly larger than the outer diameter of end portions 76, thereby enabling bushing 82 to fit over end portions 76. The fit is such that bushings 82 can rotate about end portions 76 if sufficient rotational force is applied; however, such rotational ability is not necessary.

Figure 5:
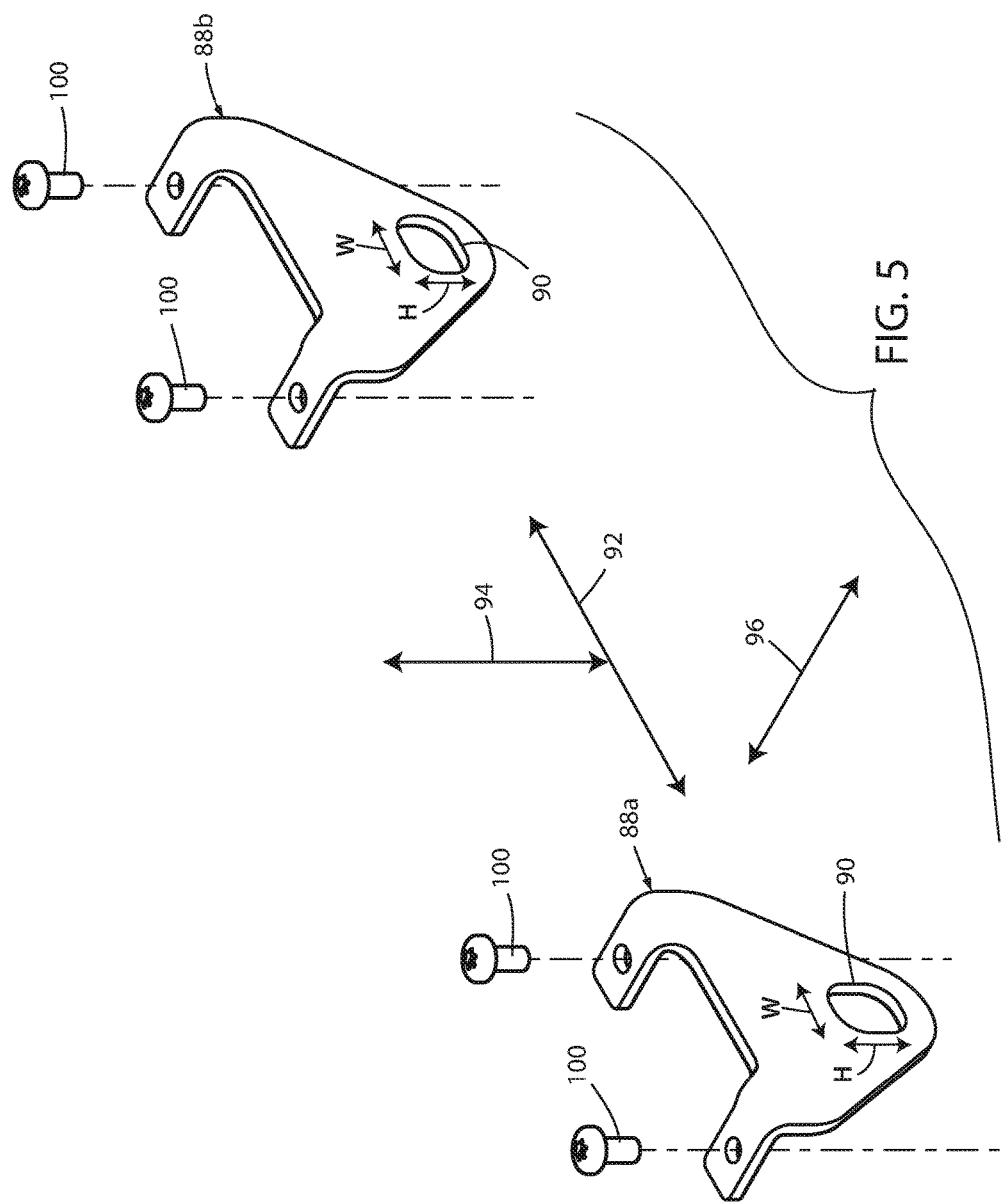
FIG. 5 is an enlarged, perspective view of a pair of load cell brackets shown in FIG. 3.
Figure 6:
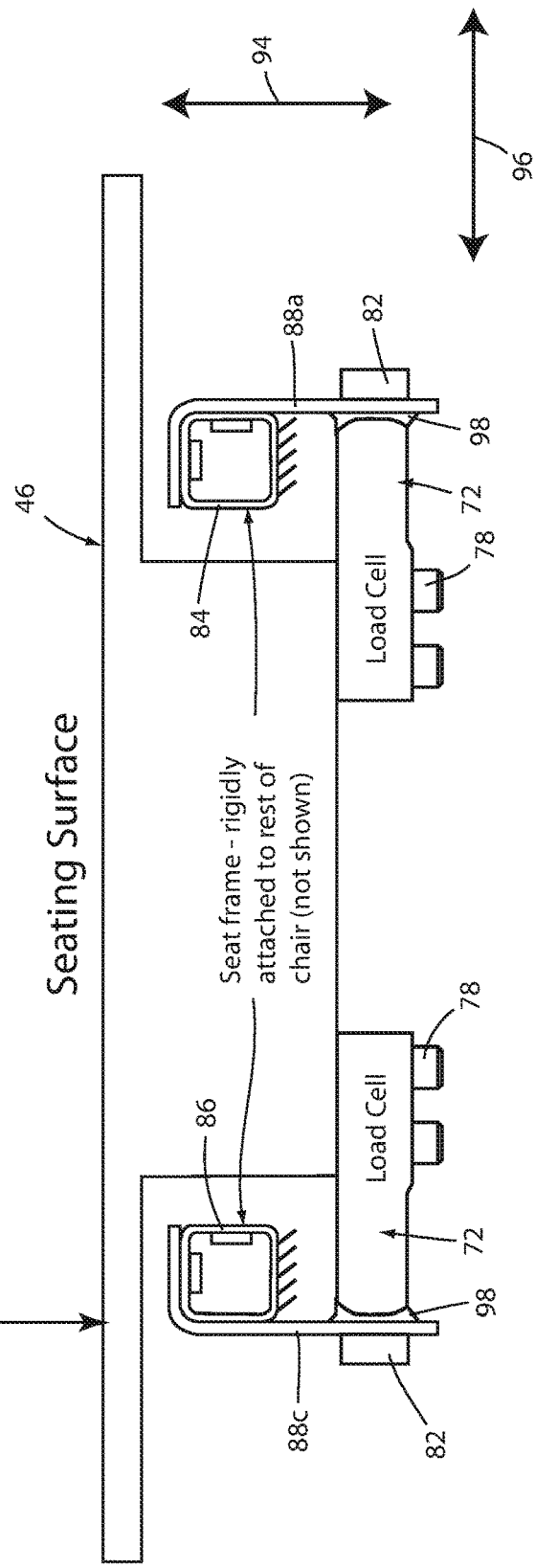
FIG. 6 is a side, sectional view of the seat pan and frame of FIG. 3.

Frame 42 includes a front cross bar 84 and a rear cross bar 86 (FIGS. 3 & 6). A right front load cell bracket 88a is rigidly coupled to front cross bar 84 by a pair of fasteners 100. A left front load cell bracket 88b is also rigidly coupled to front cross bar 84 by a pair of fasteners 100. A right rear load cell bracket 88c and a left rear load cell bracket 88d are each rigidly coupled to rear cross bar 86 (FIG. 3). Each load cell bracket 88 includes an aperture 90 defined therein. As shown in FIG. 5, the apertures 90 defined in right and left front load cell brackets 88a and 88b each have a height dimension H and a width dimension W. The height H and width W dimensions of the aperture 90 defined in left rear load cell bracket 88d are the same as the height H and width W dimensions of the aperture 90 defined in left front load cell bracket 88b, as will be discussed in greater detail below.

Turning specifically to right front load cell bracket 88a (FIG. 5), aperture 90 defines a generally vertical channel having a height dimension H that is greater than width dimension W. Width dimension W of bracket 88a is sized to be just large enough to receive bushing 82. That is, when bushing 82 (and the end portion 76 of the corresponding load cell 74) are inserted into aperture 90 of bracket 88a, bushing 82 and the end portion 76 of the load cell 74 are not free to move in a right-left direction 92, subject to a manufacturing tolerance (which may be on the order of a few thousandths of an inch). The height dimension H of aperture 90 of bracket 88a, however, is greater than the outer diameter of the bushings 82. As a result, when an end portion 76 of a load cell 74, along with its bushing 82, is inserted into aperture 90 of bracket 88a, the end portion 76 is able to be vertically positioned at different locations within the vertical channel defined by this aperture 90. In sum, by being shaped as a generally vertical channel, aperture 90 of bracket 88a constrains the end portion 76 of a load cell 74 in the left-right direction 92, but provides no such similar constraint in a vertical or up-down direction 94.

Turning next to the left front load cell bracket 88b (FIG. 5), aperture 90 defined therein is a generally horizontal channel that extends rightward and leftward, as viewed from a person sitting on seat 22. Height dimension H of bracket 88b is sized to be just large enough to receive bushing 82. That is, when bushing 82 (and the end portion 76 of the corresponding load cell 74) are inserted into aperture 90 of bracket 88b, bushing 82 and the end portion 76 of the load cell 74 are constrained in vertical direction 94, subject to a manufacturing tolerance (which may be on the order of a few thousandths of an inch). The width dimension W of aperture 90 of bracket 88b, however, is greater than the outer diameter of the bushings 82. As a result, when an end portion 76 of a load cell 74, along with its bushing 82, is inserted into aperture 90 of bracket 88b, the end portion is able to be horizontally positioned at different locations within the horizontal channel defined by this aperture 90. In sum, by being shaped as a generally horizontal channel, aperture 90 of bracket 88b constrains the end portion 76 of a load cell 74 in vertical direction 94, but provides no such similar constraint in the right-left direction 92.

Turning to right rear load cell bracket 88c, the aperture 90 defined therein is a circular aperture having an inner diameter substantially equal to the outer diameter of the bushings 82. When so dimensioned, right rear load cell bracket 88c substantially constrains the bushing 82 (and load cell end portion 76 inserted therein) in both the up-down direction 94 and the left-right direction 92. That is, the load cell end portion 76 and bushing 82 that are inserted into aperture 90 of right rear load cell bracket 88c must be both vertically and horizontally aligned with that aperture 90.

Turning to left rear load cell bracket 88d, the aperture 90 defined therein is the same as the aperture 90 defined in left front load cell bracket 88b. That is, it is shaped as a generally horizontal channel that permits positioning of the bushing 82 at different locations in the right-left direction 92, but constrains the bushing 82 in vertical direction 94.

Seat pan 46 is also constrained in a forward-rearward direction 96 by way of brackets 88, bushings 82, and spring washers 80. That is, each bushing 82 includes a circumferential flange 98 that has an outer diameter that is sufficiently large so that it does not fit through any of apertures 90. When seat pan 46 is attached frame 42, each circumferential flange 98 is butted up against the portion of the adjacent bracket 88a-d in which the aperture 90 is defined. Because brackets 88a-d are rigidly secured to frame 42, the space between the brackets in the forward-rearward direction 96 is fixed. Movement of seat pan 46 in the front-rear direction 96 is thus prevented by the abutment of circumferential flanges 98 against the brackets 88. To the extent manufacturing tolerances create any slack between the circumferential flanges 98 and their adjacent brackets 88, this is removed through the action of spring washers 80. That is, spring washers 80 bias the bushings 82 and their circumferential flanges 98 into contact with the brackets 88, thereby immobilizing seat pan 46 in the forward-rearward direction 96.

In combination, the four brackets 88a-d constrain seat pan 46 in all three directions: right-left direction 92, up-down direction 94, and forward-rearward direction 96. Thus, seat pan 46 does not wiggle when it is attached to frame 42. However, by shaping three of the apertures 90 to be elongated channels, with one channel oriented vertically and the other two channels oriented horizontally, it is not necessary for the end portions 76 of each load cell 72 to perfectly align with all of the apertures 90 during the manufacturing of person support apparatus 20. More specifically, the misalignment of one or more end portions 76 of load cells 72 with one or more aperture 90 can be accommodated during the manufacturing process of person support apparatus 20 without introducing any stresses or strains onto load cells 72.

This can be better understood by discussing the potential variations in the dimensions of seat pan 46, load cells 74, and/or brackets 88 during the manufacturing process. Suppose, for example, that after a seat pan 46 is manufactured and the load cells 74 are attached thereto, that the distance between the centers of the end portions 76 of the two front load cells 74 does not exactly match the distance between the centers of the apertures 90 defined in the front brackets 88a and 88b. This mismatched distance does not require bending, stressing, straining, or otherwise forcing the seat pan 46 and load cells 74 into these apertures 90 because of the horizontally elongated nature of aperture 90 defined in left front load cell bracket 88b. In other words, variations in the horizontal distance between the two front load cells 74 are accommodated by the elongated channel design of aperture 90 in left front load cell bracket load cell bracket 88b.

In contrast, if aperture 90 in bracket 88b was not elongated in the left-right direction, it would not be possible to insert the end portions 76 of the front load cells 72 into apertures 90 of front brackets 88a and 88b without bending, straining, stressing, or otherwise subjecting seat pan 46, load cells 72, and/or brackets 88 to some sort of deformation forces in order to force these end portions 76 into the front bracket apertures 90. Further, such bending, straining, stressing, or deformation would create forces that were sensed by load cells 74, and it would become necessary to measure these forces for each person support apparatus 20 that was manufactured in order to differentiate these forces from the forces due to loads applied on top of seat 22, as will be discussed further below.

In a similar manner, the horizontally elongated shape of aperture 90 in rear left seat bracket 88d ensures that manufacturing variations of any dimension in the right-left direction 92 of seat pan 46, load cells 72, and/or brackets 88 do not create misalignments between the end portions 76 of load cells 72 and apertures 90. When seat pan 46 is attached to frame 42, there are only two bracket apertures 90 that are constrained in the right-left direction (those apertures 90 defined in brackets 88a and 88c). It is therefore unnecessary to introduce any permanent forces in the right-left direction onto load cells 72 in order to mount seat pan 46 to frame 42 because, by having only two right-left constraints, there can be no misalignment (i.e. a straight line can always be defined between two discrete points).

With respect to any variations in the dimensions of seat pan 46, load cells 72, and/or brackets 88 in the vertical direction, 94, these too are accommodated by the vertically elongated shape of aperture 90 defined in right front load cell bracket 88a. That is, it is not necessary to subject load cells 72 to any permanent forces in the vertical direction in order to mount seat pan 46 to frame 42, even if there isn't perfect vertical alignment between each of the load cells 72 and their respective apertures 90.

As a result of the channel designs of apertures 90 in brackets 88a, 88b, and 88d, load cells 72 are not subjected to any forces (other than the weight of seat pan 46 and its attached components) when seat pan 46 is mounted to frame 42. It is therefore not necessary to take load cell readings during the manufacturing process for each individual person support apparatus 20, and records those readings in a memory 106 (FIG. 7) on board the corresponding person support apparatus 20 so that controller 104 (FIG. 7) can zero-out the non-weight components of the load cell outputs that are due to manufacturing tolerances and/or other misalignments between the load cells and the structures that support the load cells (e.g. apertures 90). Consequently, in at least some embodiments, the only load cell calibration data that is stored in memory 106 on board the person support apparatus 20 is calibration data that is specific to the individual load cell. In other words, person support apparatus 20 can be manufactured such that it only stores in memory 106 load cell-specific calibration data, and does not store any person support apparatus-specific load cell calibration data.

FIG. 7 illustrates in greater detail control system 102. Control system 102 includes controller 104, which is in communication with memory 106, load cells 72, actuators 32, 34, 36, and 38, right and left control panels 108, and an alarm 110. Controller 104, as noted above, controls the extension and retraction of the actuators 32-38. Controller 104 is constructed of any electrical component, or group of electrical components, that are capable of carrying out the functions described herein. In many embodiments, controller 104 is a conventional microcontroller, although not all such embodiments need include a microcontroller. In general, controller 104 includes any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 104 in carrying out the functions described herein, as well as the data necessary for carrying out these functions are stored in memory 106, or in another memory accessible to controller 104.

In one embodiment, controller 104 is programmed to carry out an exit detection function and to issue an alert using alarm 110 if controller 104 detects that an occupant of seat 22 has departed. Alarm 110 may be an audio alarm, a visual alarm, or a combination thereof. Further, alarm 110 may be located entirely on person support apparatus 20, or it may be located off-board person support apparatus 20, or it may be a combination of both a local alarm and a remote alarm.

In the embodiment shown in FIG. 7, person support apparatus 20 includes two control panels 108. A first one of these is located on a first side of backrest 24 generally toward a top end of backrest 24 (see FIG. 1). A second one of these is located in a similar location but on the left side of backrest 24. Control panels 108 allow a user to control the various functions of person support apparatus 20. Control panels 108 may be constructed in the same manner as, operate in the same manner as, and/or carry out any one or more of the same functions that are carried out using the control panels disclosed in any of the following commonly assigned U.S. patent application Ser. No. 14/838,693 filed Aug. 28, 2015 by inventors Daniel Brosnan et al. and entitled PERSON SUPPORT APPARATUS WITH ACTUATOR BRAKE CONTROL; Ser. No. 14/549,006 filed Nov. 20, 2014 by inventors Richard Derenne et al. and entitled PERSON SUPPORT APPARATUSES WITH VIRTUAL CONTROL PANELS; Ser. No. 62/166,354 filed May 26, 2015 by inventors Michael Hayes et al. and entitled USER INTERFACES FOR PATIENT CARE DEVICES; Ser. No. 62/171,472 filed Jun. 5, 2015 by inventors Aaron Furman et al. and entitled PATIENT SUPPORT APPARATUSES WITH DYNAMIC CONTROL PANELS; and Ser. No. 62/186,464 filed Jun. 30, 2015 by inventors Marko Kostic et al. and entitled PERSON SUPPORT APPARATUSES WITH LOAD CELLS, the complete disclosures of all of which are hereby incorporated herein by reference in their entirety.

Figure 8:
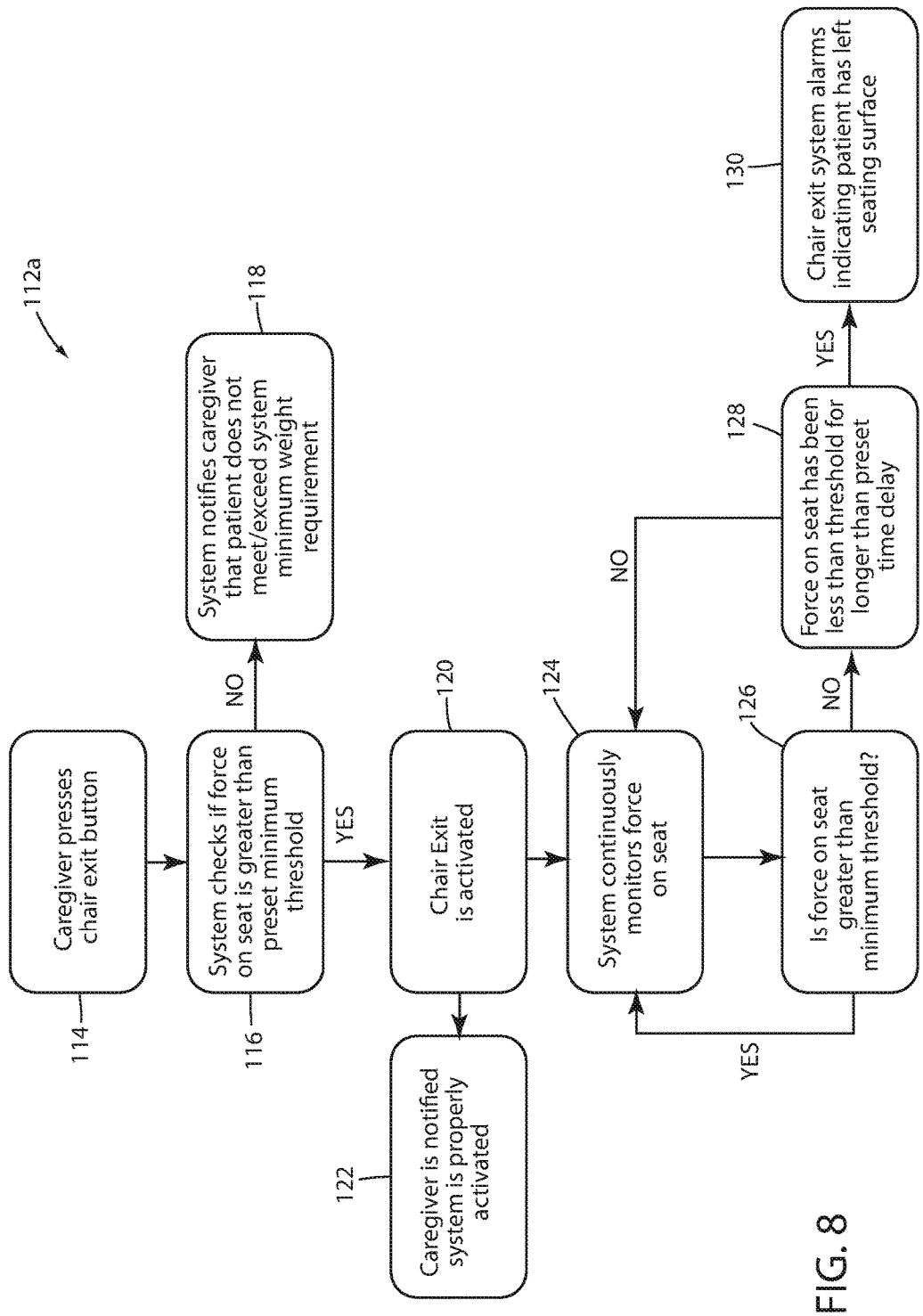
FIG. 8 is a block diagram of a first embodiment of an exit alerting algorithm that may be incorporated into the person support apparatus of FIG. 1.
Figure 9:
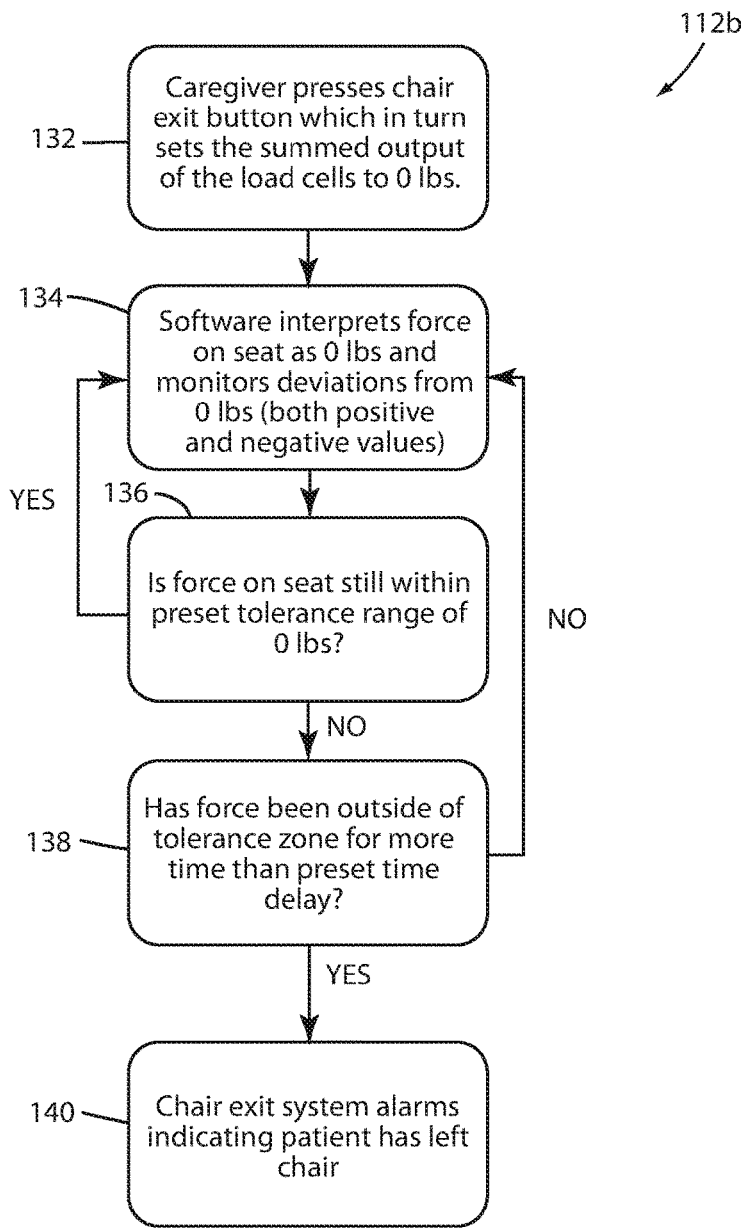
FIG. 9 is a block diagram of a second embodiment of an exit alerting algorithm that may be incorporated into the person support apparatus of FIG. 1.
Figure 10:
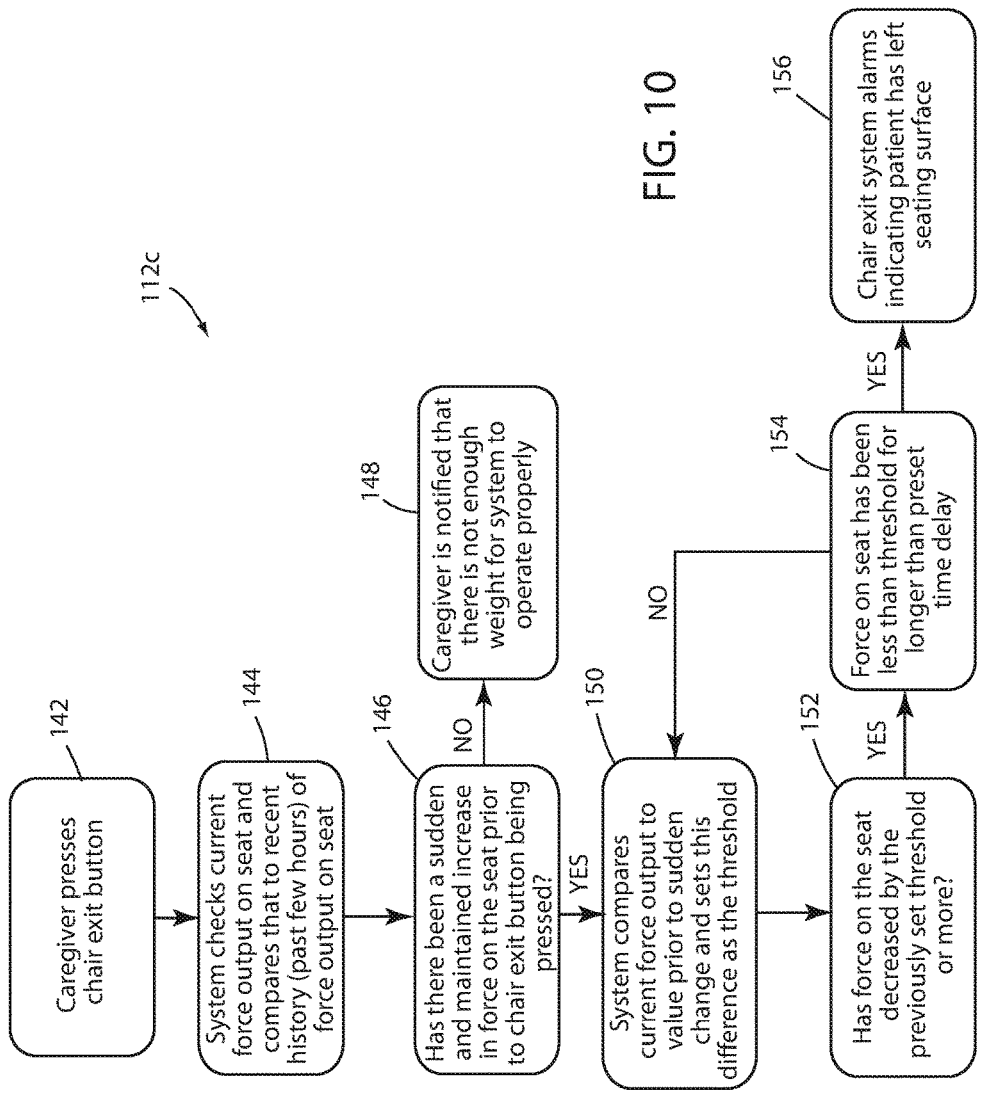
FIG. 10 is a block diagram of a third embodiment of an exit alerting algorithm that may be incorporated into the person support apparatus of FIG. 1.

When controller 104 is programmed to carry out an exit detection function, it may utilize any one or more of the exit detection algorithms 112a, 112b, and 112c shown in FIGS. 8, 9, and 10, respectively. These different exit detection algorithms 112 will now be described in more detail.

Exit detection algorithm 112a (FIG. 8) begins at an initial step 114 when a user attempts to activate the exit detection feature of person support apparatus 20. More specifically, controller 104 proceeds to step 114 when a user presses one or more buttons on either of control panels 108 that arm the exit detection alerting function. In some instances, the one or more buttons used to arm the exit detection alerting function are implemented as toggle buttons, thereby allowing the user to disarm the exit detection alerting function by pressing the one or more buttons once more.

After exit detection algorithm 112a is initiated at step 114, controller 104 automatically takes a weight reading using load cells 72 at step 116. Controller 104 also compares at step 116 the weight reading from load cells 72 with a minimum threshold value that is stored in memory 106. The minimum threshold value is a minimum weight value that must be present in order for the exit detection alerting function to be activated. In general, it is a weight value corresponding to the smallest occupant (lightest weight) whose departure from person support apparatus 20 the exit alerting feature can detect. Stated alternatively, any load on seat pan 46 that is less than this minimum threshold will be interpreted by controller 104 as the result of something other than a person. In such a case, controller 104 therefore proceeds to step 118 under the assumption that no person is currently occupying person support apparatus 20, and therefore does not activate the exit alerting function (because an occupant's departure cannot be detected when no occupant is present). Further, at step 118, controller 104 provides a notification, via one or both control panels 108, that a minimum weight requirement has not been met and that the exit detection alerting feature can therefore not be armed.

If controller 104 determines at step 116 that sufficient weight is present, it arms the exit detection feature at step 120. Notification that the exit detection feature has been successfully armed is provided to the user by controller 104 at step 122. Such notification may take on the form of one or more lights, one or more sounds, or a combination thereof. After steps 120 and 122 are completed, controller 104 moves to step 124 where it continuously monitors the forces detected by load cells 72. That is, controller 104 repetitively reads the outputs of load cells 72 and sums them together. After each reading, controller 104 compares the sum of the weights detected by load cells 72 to a minimum threshold at step 126. The minimum threshold used at step 126 is the same minimum threshold used at step 116.

If controller 104 determines at step 126 that the total weight detected by load cells 72 is greater than the minimum threshold, controller 104 returns back to step 124 and takes another reading from the load cells 72. If the total weight detected by load cells 72 is not greater than the minimum threshold, then controller 104 moves to step 128 where it monitors how long the total weight remains below the minimum threshold. If the total weight remains below the minimum threshold for more than a preset time delay, then controller 104 concludes that the occupant has departed person support apparatus 20 and issues an alarm at step 130. The purpose of step 128 is to ensure that non-exiting movement of the occupant of person support apparatus 20, which may temporarily reduce the total weight detected by load cells 72 below the minimum threshold, does not trigger an exit alert when, in fact, the occupant has not exited, but instead has merely shifted positions on person support apparatus 20.

As should be apparent from the above description of exit detection algorithm 112a, controller 104 does not compute a center of gravity of an occupant of person support apparatus 20 and use that center of gravity to determine when to issue an exit alert. Similarly, controller 104 does not compute any ratio or ratios of the forces detected by the load cells 74 when deciding whether to issue an exit alert. Still further, occupants of person support apparatus 20 who have different weights do not affect the calculations made by controller 104.

As an alternative to exit detection algorithm 112*a*, controller 104 may be programmed to execute exit detection algorithm 112*b*, which is illustrated in FIG. 9. Exit detection algorithm 112*b* begins at an initial step 132 when a user presses an exit detection activation button, or manipulates another suitable control, on person support apparatus 20. In response to this user activation, controller 104 automatically takes a reading from load cells 72 at initial step 132 and sums these readings into a total weight. At step 134, controller 104 stores in memory 106 the total weight reading taken at step 132 as a baseline reading. At the next step 136, controller 104 takes another set of readings from load cells 72 and determines whether the total weight detected by the load cells has deviated from the saved baseline reading by more than a predetermined amount. This predetermined amount represents a tolerance value that is selected to accommodate minor variations in the outputs of the load cells 72. If controller 104 determines that the reading has not deviated from the baseline reading by more than the predetermined tolerance, then controller 104 returns back to step 134, where it takes another set of readings from load cells 72. If controller 104 determines at step 136 that the reading has deviated from the baseline reading by more than the predetermined tolerance, it moves to step 138 where it monitors how long the deviation lasts. If the deviation persists for more than a preset time delay, then controller 104 issues an exit alert at step 140. If the deviation does not last for more than the preset time delay, then controller 104 returns to step 134 without issuing an exit alarm. The preset time delay of step 138 performs the same function as the preset time delay of step 128 of algorithm 112*a* discussed above (i.e. it avoids alarms resulting from changes in the detected weight that are due to the occupant merely shifting his or her position on person support apparatus 20, rather than exiting from person support apparatus 20).

As should be apparent from the above description of exit detection algorithm 112*b*, controller 104 does not compute a center of gravity of an occupant of person support apparatus 20 and use that center of gravity to determine when to issue an exit alert. Similarly, controller 104 does not compute any ratio or ratios of the forces detected by the load cells 74 when deciding whether to issue an exit alert. However, occupants of person support apparatus 20 who have different weights will affect the calculations made by controller 104 by changing the numeric value of the baseline reading stored in memory 106.

As yet another alternative to exit detection algorithms 112*a* and 112*b*, controller 104 may be programmed to execute exit detection algorithm 112*c*, which is illustrated in FIG. 10. Exit detection algorithm 112*c* begins at an initial step 142 when a user presses an exit detection activation button, or manipulates another suitable control, on person support apparatus 20. After this initial step, controller 104 proceeds to step 144 where it takes a reading of the outputs of load cells 72. This current total weight reading is then compared by controller 104 to previous total weight readings that were taken and stored in memory 106. The previous readings are taken and stored automatically by controller 104 prior to the activation of exit detection algorithm 112*c*. In some embodiments, the previous readings are taken and stored over a span of several hours.

From step 144, controller 104 proceeds to step 146 where it searches the stored total weight readings for readings indicating a sudden and sustained increase in total weight detected by load cells 72. The sudden and sustained increase in total weight readings that controller 104 searches for in step 146 corresponds to the weight that is added to person support apparatus 20 when the occupant first enters person support apparatus 20. If controller 104 is unable to find such a sudden and increased weight reading, or readings, it proceeds to step 148 where it notifies the user that it cannot arm the exit detection feature because there is insufficient weight on the person support apparatus 20. In other words, controller 104 effectively concludes that nobody is currently occupying person support apparatus 20 due to the absence of any weight records indicating the entry of such an occupant onto person support apparatus 20.

If controller 104 locates one or more previous weight readings at step 146 that correspond to a sudden and sustained increase in weight, it proceeds to step 150 where it determines the value of one or more weight readings that were taken just prior to the sudden and sustained weight increase. This weight reading (or the average of these weight readings if more than one of these weight readings is used) is assumed by controller 104 to correspond to the tare weight when the occupant is absent. In other words, controller 104 sets this prior weight reading (or the average of multiple prior weight readings) equal to a tare weight and subtracts it from the current weight reading. The difference is stored in memory 106 and corresponds to the weight of the occupant.

At step 152, controller 104 continues to take subsequent total weight readings from load cells 72 and determine if they have decreased by an amount substantially equal to, or greater than, the weight of the occupant (which, as noted, was determined at step 150). If the total weight has decreased by an amount equal to the occupant's weight, or more, controller 104 moves to step 154 where it monitors how long the total weight remains decreased by this amount. More specifically, it determines if the weight decrease persists for more than a preset time delay. Step 154 is similar to, and serves the same purpose as, steps 128 and 138 of algorithms 112*a* and 112*b*, respectively. If the weight decrease persists for longer than the preset time delay, controller 104 moves to step 156 where it issues an exit alert. If the weight decrease does not persist for longer than the preset time delay, controller 104 returns to step 150 where it takes a new set of weight readings and proceeds in the manner previously described.

As should be apparent from the above description, exit detection algorithm 112*c*, like exit detection algorithms 112*a* and 112*b*, does not involve computing or using a center of gravity of an occupant of person support apparatus 20 to determine whether to issue an exit alert. Algorithm 112*c* also does not compute any ratio or ratios of the forces detected by the load cells 74 when deciding whether to issue an exit alert. Algorithm 112*c*, however, does utilize the weight of the occupant as the threshold for determining occupant departure, and the threshold value used for comparison at step 150 will vary in response to varying weights of the occupant.

In addition to, or in lieu of, any of exit detection algorithms 112*a*, 112*b*, and/or 112*c*, controller 104 is programmed, in at least some embodiments, to utilize load cells 72 to carry out a scale function. That is, controller 104 is programmed to be able to determine a weight of an occupant of person support apparatus 20, regardless of whether or not the exit detection feature is armed, or even present on person support apparatus 20. In at least one embodiment, in order to carry out this scale function, controller 104 utilizes the weight stored in memory 106 of seat pan 46 and the components supported thereon, as discussed earlier. This value is used when it is desirable to allow a user to weigh an occupant without having to zero the scale system prior to the occupant entering person support apparatus 20. Thus, for example, if controller 104 takes a weight reading of load cells 72 while person support apparatus 20 is occupied, controller 104 can determine the person's weight by simply subtracting the weight stored in memory 106 that corresponds to the weight of seat pan 46 and the components supported thereon. It is not necessary for an "empty" weight reading to have been taken prior to the occupant entering person support apparatus 20 in order for an accurate reading of the occupant's weight to be determined.

The reason such an "empty" weight reading is not necessary is partially due to the fact of the mounting arrangement between seat pan 46 and frame 42, previously described. That mounting arrangement ensures that load cells 72 are not introduced to any permanent forces during the manufacturing process. As a result, load cells 72 will only detect forces results from the weight of seat pan 46 and the components supported thereon, when person support apparatus 20 is empty. Because this weight can be calculated ahead of time by the manufacturer of person support apparatus 20, an accurate weight reading of an occupant can be obtained by simply subtracting this known weight from the weight reading taken when the occupant is present on person support apparatus 20. Stated alternatively, controller 104 does not need to determine what portion of the sensed "empty" weight is the result of forces introduced during the manufacturing process and what portion is due to the weight of seat pan 46 and its supported components because the former is zero. Consequently, controller 104 can accurately determine an occupant's weight without any zeroing process (whether manually triggered or automatically carried out without user-prompting).

In at least one embodiment, controller 104 is programmed to utilize measured weight readings of the occupant when controlling one or more of the actuators 32, 34, 36, and/or 38. More specifically, in such an embodiment, controller 104 automatically takes periodic readings from load cells 72 without user prompting. From these readings, and the known and stored weight of seat pan 46 and its supported components, controller 104 computes the weight of the occupant. The calculated weight of the occupant is then compared to one or more thresholds. The thresholds may comprise weight limits for any one or more of the actuators 32-28. If the weight limit is exceeded for any of these actuators, controller 104 prevents those actuators from being actuated and issues a weight warning. Alternatively, or additionally, the thresholds may comprise one or more values that are less than these weight limits, but high enough to indicate that one or more of the actuators 32-38 should be driven in a different manner. For example, if the occupant's weight exceeds a threshold that is less than the actuator's limit, but higher than a normal weight, controller 104 may control one or more actuators 32-38 by changing the speed at which they are driven. Still further, in some embodiments, if one or more weight thresholds are exceeded, controller 104 may limit the movement of actuators 32-38 to a reduced range in order to reduce tipping potential or instability potential. Still other types of thresholds may be used, and still other types of actions may be taken in response to violations of those thresholds.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A person support apparatus comprising:
   a frame;
   a support surface adapted to support a person thereon;
   a plurality of load cells having a nose and a body, each of the load cells coupled to the frame and the support surface such that a weight applied to the support surface is detected by the plurality of load cells;
   a first channel dimensioned to receive a nose of a first one of the plurality of load cells and constrain the first load cell in a first direction but not a second direction when the nose of the first load cell is inserted into the first channel, the first direction being perpendicular to the second direction; and
   a second channel dimensioned to receive a nose of a second one of the plurality of load cells and constrain the second load cell in the second direction but not the first direction when the nose of the second load cell is inserted into the second channel.

2. The person support apparatus of claim 1 wherein the support surface is a seat of a chair.

3. The person support apparatus of claim 2 further including a controller adapted to determine if the seat is occupied based upon outputs from the load cells.

4. The person support apparatus of claim 3 wherein the controller is adapted to issue an exit alert if a total weight detected by the plurality of load cells falls below a predetermined minimum threshold.

5. The person support apparatus of claim 3 wherein the controller is adapted to issue an exit alert if a total weight detected by the plurality of load cells falls by more than a predetermined amount relative to a previously stored total weight.

6. The person support apparatus of claim 5 wherein the previously stored total weight is taken automatically by the controller.

7. The person support apparatus of claim 6 wherein the previously stored total weight is taken automatically by the controller substantially at the time a user of the person support apparatus activates an exit alerting feature of the person support apparatus.

8. The person support apparatus of claim 3 wherein the controller is adapted to issue an exit alert if a sum of weight detected by the plurality of load cells falls by more than a variable amount relative to a previously stored total weight.

9. The person support apparatus of claim 8 wherein the variable amount is based upon the previously stored total weight.

10. The person support apparatus of claim 1 wherein the first and second channels are defined in first and second brackets, respectively, and the first and second brackets are fixedly secured to the frame.

11. The person support apparatus of claim 10 further including a first spring washer positioned around the nose of the first load cell and adapted to eliminate slack between the first load cell and the first bracket in a third direction, the third direction being perpendicular to both the first and second directions.

12. The person support apparatus of claim 1 further including a third channel dimensioned to receive a nose of a third one of the plurality of load cells and constrain the third load cell in the first direction but not the second direction.

13. The person support apparatus of claim 12 wherein the first direction is a generally vertical direction.

14. The person support apparatus of claim 12 further including a fourth channel dimensioned to receive a nose of a fourth one of the plurality of load cells and constrain the fourth load cell in both the first and second directions.

15. A person support apparatus comprising:
a frame;
a support surface adapted to support a person thereon;
a plurality of load cells, each of the load cells coupled to the frame and the support surface such that a weight applied to the support surface is detected by the plurality of load cells; and
a plurality of load cell brackets, each of the load cell brackets adapted to support an end of one of the load cells, the load cell brackets constructed such that no forces from the support surface, other than weight forces, are applied to the load cells after the support surface is coupled to the frame; and
wherein the load cell brackets include channels defined therein that receive the ends of the load cells, and a first one of the channels of a first one of the load cell brackets constrains an end of a first one of the load cells in a first direction but not a second direction, and a second one of the channels of a second one of the load cell brackets constrains an end of a second one of the load cells in the second direction but not the first direction, the first and second directions being perpendicular to each other.

16. The person support apparatus of claim 15 wherein the load cell brackets are dimensioned so that the support surface is not subjected to any deformation detectable by the load cells when the support surface is coupled to the frame.

17. The person support apparatus of claim 15 wherein the support surface is a seat of a chair.

18. The person support apparatus of claim 17 further including a controller in communication with the load cells and a memory, the memory including load-cell specific calibration data stored therein and a weight value, the controller adapted to determine if the seat is occupied or not using the load-cell specific calibration data and the weight value.

19. The person support apparatus of claim 18 wherein the weight value is stored in the memory when the person support apparatus is manufactured and has the same magnitude as weight values stored in memories of other like-manufactured person support apparatuses.

20. The person support apparatus of claim 19 wherein the controller uses no person support apparatus-specific calibration data that is individually tailored to the person support apparatus when determining if the seat is occupied or not.

21. The person support apparatus of claim 17 further including a controller adapted to determine a weight of an occupant of the seat and to limit a functionality of at least one motor of the person support apparatus if the weight of the occupant of the seat exceeds a threshold.

22. The person support apparatus of claim 17 further including a controller adapted to determine a weight of an occupant of the seat and to change a speed of at least one motor of the person support apparatus if the weight of the occupant of the seat exceeds a threshold.

23. The person support apparatus of claim 17 further including a controller adapted to issue an exit alert if a total weight detected by the plurality of load cells subsequently drops from an initial total weight reading by more than a predetermined amount, the controller further adapted to automatically take the initial total weight reading in response to a user arming an exit alerting feature of the person support apparatus.

* * * * *